(12) United States Patent
Sinnett et al.

(10) Patent No.: US 8,193,926 B2
(45) Date of Patent: Jun. 5, 2012

(54) PIEZOELECTRIC TRIGGERING MECHANISM

(75) Inventors: Jay C. Sinnett, Greenville, SC (US); John D. Adamson, Simpsonville, SC (US); George P. O'Brien, Piedmont, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 505 days.

(21) Appl. No.: 12/278,623

(22) PCT Filed: Mar. 14, 2006

(86) PCT No.: PCT/US2006/009101
§ 371 (c)(1),
(2), (4) Date: Jan. 15, 2009

(87) PCT Pub. No.: WO2007/106086
PCT Pub. Date: Sep. 20, 2007

(65) Prior Publication Data
US 2009/0315694 A1    Dec. 24, 2009

(51) Int. Cl.
*B60C 23/00*    (2006.01)

(52) U.S. Cl. ............ 340/443; 73/146.5; 73/763; 73/768; 340/442

(58) Field of Classification Search .................. 340/442, 340/445, 447, 443; 73/146.5, 702, 763, 768; 152/520, 381.5; 377/24.1
See application file for complete search history.

(56) References Cited

U.S. PATENT DOCUMENTS

| | | |
|---|---|---|
| 4,117,452 A | 9/1978 | Snyder et al. |
| 4,160,234 A | 7/1979 | Karbo et al. |
| 4,210,898 A | 7/1980 | Betts |
| 4,246,567 A | 1/1981 | Miller |

(Continued)

FOREIGN PATENT DOCUMENTS

DE    203 13 789 U1    11/2003

(Continued)

OTHER PUBLICATIONS

Supplementary European Search Report for EP 06 73 8187, Dated Nov. 4, 2009.

(Continued)

*Primary Examiner* — Brent Swarthout
(74) *Attorney, Agent, or Firm* — Dority & Manning, P.A.

(57) ABSTRACT

A piezoelectric triggering mechanism (10) includes a piezoelectric element (12), such as the transducer of a SAW device, that is configured to crack or break upon being subjected to excessive levels of mechanical force or other triggering mechanisms, thus generating a burst of electromagnetic energy. The large impulse of energy can then be conditioned (14) through resonant circuits or antennas and modulated (16) with an identification pattern through appropriate structures (such as SAW electrodes) to send a breakage indication signal to a remote receiver (18). Piezoelectric elements (12) may be integrated with a pneumatic tire structure to provide indication upon pressure loss or tire failure. Piezoelectric elements (12) may also be integrated with safety support features of some tire structures to provide indication of tire operation in a run-flat mode of operation. Related aspects of the present piezoelectric triggering technology employ a piezoelectric element (12) in a trigger detection method, which may involve detection of such occurrences as breach of security via opening of a sealed access structure or breakage of a glass panel, deployment of an airbag, loss of pressure or excess deflection in a tire, presence of smoke in a given location, and other rupture and sensor applications.

18 Claims, 2 Drawing Sheets

U.S. PATENT DOCUMENTS

| | | | |
|---|---|---|---|
| 5,499,541 | A | 3/1996 | Hopf et al. |
| 5,891,279 | A | 4/1999 | Lacour |
| 6,438,193 | B1 | 8/2002 | Ko et al. |
| 7,999,663 | B2 * | 8/2011 | Mancosu et al. ............ 340/445 |
| 2002/0117005 | A1 | 8/2002 | Vile et al. |
| 2003/0234722 | A1 * | 12/2003 | Lonsdale et al. ............ 340/445 |
| 2004/0020299 | A1 | 2/2004 | Freakes et al. |
| 2004/0212486 | A1 | 10/2004 | Dinello et al. |
| 2005/0110277 | A1 * | 5/2005 | Adamson et al. ............ 290/1 R |

FOREIGN PATENT DOCUMENTS

| | | |
|---|---|---|
| EP | 0 937 615 A | 8/1999 |
| JP | 10-148653 A | 6/1998 |

OTHER PUBLICATIONS

PCT International Search Report for PCT/US2006/09101, Jan. 31, 2007.

* cited by examiner

PIEZOELECTRIC TRIGGERING MECHANISM

FIELD OF THE INVENTION

The present invention generally concerns a piezoelectric device and associated elements that function as a self-powered triggering mechanism upon occurrence of a detected event. Piezoelectric elements may be configured to break upon the occurrence of certain events, resulting in the generation of a relatively large energy impulse signal which may be conditioned and stored for later detection or instantaneously relayed to a remote location.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, etc. Such performance information may become useful in tire monitoring and warning systems, and may even potentially be employed with feedback systems to regulate proper tire pressure levels and with vehicle performance and control systems.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth mining equipment. Entire fleets of vehicles could be tracked using RF tag transmission.

Certain piezoelectric materials have been utilized in various applications related to tire and wheel assemblies and other vibrational systems. For example, piezoelectric transducers can be used as sensors to measure the response to an impressed acoustic field. Piezoelectric actuators can convert an applied electric field into kinematic energy and mechanical displacement. Piezoelectric reeds and other specialized piezoelectric formations have been employed to convert mechanical vibrations from tire rotation to electrical energy for powering tire electronics assemblies.

The above applications and others employing piezoelectric materials are typically configured for operation such that the piezoelectric materials are subjected to limited levels of strain and/or electrical charge. For example, it is typically not desirable to subject a piezoelectric sensor or power generation device to such high levels of strain that the piezoelectric materials crack or break. Such an occurrence would hinder or destroy the intended functionality of the piezoelectric device and require replacement of the piezoelectric components.

In accordance with the present subject matter, piezoelectric devices are configured for use in environments where their structural integrity is intentionally jeopardized. More particularly, piezoelectric devices are configured to crack or break upon being subjected to a certain triggering condition and thus serve in combination with other circuit elements as a self-powered signaling mechanism for one-time use.

SUMMARY OF THE INVENTION

In view of the recognized features encountered in the prior art and addressed by the present subject matter, improved features and steps for providing a triggering mechanism have been developed. Exemplary features and elements are disclosed for affecting the structural integrity of a piezoelectric device such that device failure indicates the occurrence of a predetermined event or triggering condition.

Various features and aspects of the subject triggering mechanism, trigger detection methodology and associated steps and elements offer a plurality of advantages. The disclosed technology provides for a triggering system that includes a relatively simple combination of elements, without requiring mechanical elements in combination with a piezoelectric element to damage or break the element. Furthermore, power generation features such as batteries or electricity are not essential for operation (although can still be used when desired). Also, signaling transmission can be made in a wireless fashion, eliminating the need for hard-wired signal connections in certain embodiments.

Another advantage of the present subject matter is that the disclosed piezoelectric signaling mechanism provides a reliable signaling method since the electrical impulse signal that occurs upon breakage of a piezoelectric element is relatively large. The magnitude of such a signal compared to signals generated upon mere deformation of a piezoelectric element are much greater such that potential confusion between such two phenomena is minimized.

A still further advantage of the presently disclosed technology is that the subject piezoelectric triggering mechanisms can be utilized in a wide variety of potential applications. One particular application concerns the use of such triggering mechanisms in a vehicle tire or wheel assembly for serving as an indication of tire pressure loss or tire failure. This application may find particular usefulness in run-flat tire assemblies. Additional vehicle applications include use of the disclosed piezoelectric triggering mechanisms to signal air bag deployment, seat belt actuation, etc. Still further potential applications may include self-powered smoke alarms, fire alarms, rupture sensors, and security systems.

In one exemplary embodiment of the present subject matter, a piezoelectric triggering mechanism includes a piezoelectric element configured to crack or break upon being subjected to a sufficient amount of mechanical force, thus generating a burst of electromagnetic energy upon cracking or breaking, and a modulation circuit coupled to the piezoelectric element and configured to receive electromagnetic energy and radiate a triggering signal therefrom.

In some more particular embodiments of the present subject matter, the piezoelectric element corresponds to a surface acoustic wave (SAW) transducer and the modulation circuit may correspond to the electrodes of such SAW transducer. The triggering mechanism may also include a conditioning circuit, which may contain an energy storage element configured to store energy generated by the piezoelectric element for subsequent identification that the piezoelectric element cracked or was broken. In some embodiments, the conditioning circuit may include a comparator element for comparing the energy output of the piezoelectric element to a predetermined threshold level. A substrate may also be provided for mounting selected of the triggering mechanism elements. The substrate may have an adhesive backing for subsequent mounting in an application environment.

In another exemplary embodiment of the present technology, a tire assembly includes a piezoelectric triggering mechanism as selectively described above integrated with a pneumatic tire structure characterized by a crown having a tread portion for making contact with a ground surface. The piezoelectric triggering mechanism may be configured such that a substantial loss of pressure to the pneumatic tire structure or excessive amounts of tire deflection results in cracking or breaking of the piezoelectric element therein.

In other more particular embodiments, the pneumatic tire structure may further include a safety support configured for mounting on a wheel rim inside the pneumatic tire structure in order to support the tread portion of the tire structure in the event of loss of inflation. Such a safety support may include an annular body having an inner surface intended to fit around the wheel rim and an outer cap intended to be engaged by the tread portion in the event of a loss of pressure. The piezoelectric element of the triggering mechanism may be integrated at a select location relative to the safety support, such as being positioned between external rivets or inside an internal cavity of the safety support.

A still further exemplary embodiment of the present technology corresponds to a method of detecting a triggered event. Such a method might include such steps as providing a piezoelectric element configured to crack or break upon being subjected to a sufficient amount of mechanical force, providing a modulation element coupled to the piezoelectric element and configured to radiate a breakage indication signal therefrom, and providing a remote receiver for detecting transmission of the breakage indication signal.

In more particular methods, additional steps selectively involve manipulating the breakage indication signal such that the signal radiated from the modulation element includes an identification pattern, relaying an alert when the remote receiver receives the breakage indication signal, and providing the piezoelectric and modulation elements on a substrate and adhering those to a given surface. The adhering step may correspond to integrating the substrate with a surface of either a tire, a tire support structure, a glass panel, a sealed access structure, a seat belt or an airbag.

Additional objects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
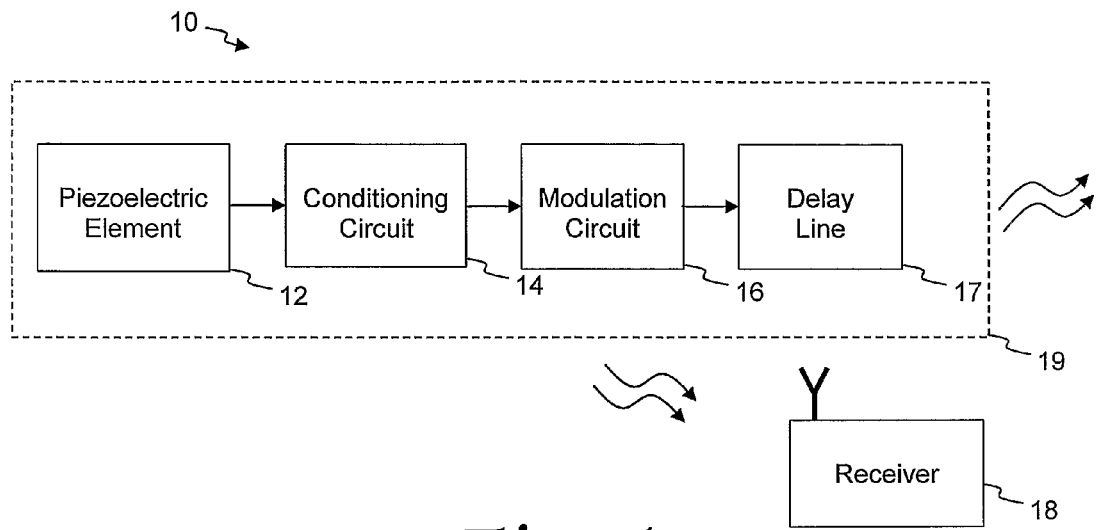
FIG. 1 provides a schematic block diagram of exemplary hardware components in a piezoelectric triggering mechanism embodiment in accordance with aspects of the present invention.

Repeat use of reference characters throughout the present specification and appended drawings is intended to represent same or analogous features or elements of the invention. It should be appreciated that various features illustrated in the appended drawings are not necessarily drawn to scale, and thus relative relationships among the features in such drawings should not limit the presently disclosed technology.

DETAILED DESCRIPTION OF THE PREFERRED EMBODIMENTS

The presently disclosed subject matter is concerned with piezoelectric devices and associated circuit elements that collectively function as a self-powered triggering mechanism upon occurrence of certain events, such as indicated by an amount of mechanical force that serves to crack or break the piezoelectric device(s), resulting in a relatively large energy impulse signal (i.e., a burst of electromagnetic energy). More particular aspects of such a piezoelectric triggering mechanism, including exemplary hardware components that may be employed in such a mechanism, will now be discussed with reference to FIG. 1.

Referring to FIG. 1, a piezoelectric triggering mechanism 10 includes a piezoelectric element 12 that is configured to crack or break upon being subjected to a sufficient amount of mechanical force. The location and configuration of piezoelectric element 12 is such that an amount of mechanical force indicative of a certain condition (e.g., tire failure or pressure loss) causes the piezoelectric element to crack or break. It is advantageous to break or crack piezoelectric element 12 because the resultant burst of energy corresponds to a relatively high level of power generation compared to simple deformation of piezoelectric element 12. Furthermore, positioning of the piezoelectric element 12 for potential breaking/cracking eliminates the need for a mechanical "clicker" or other components to strike piezoelectric element 12.

Particular configurations that might intentionally jeopardize the structural integrity of piezoelectric element 12 may vary, but some configurations of interest incorporate piezoelectric element 12 and the corresponding piezoelectric triggering mechanism 10 into a tire structure. When employed in a tire environment, the piezoelectric triggering mechanism 10 can be used to detect instances of tire deflation, pressure loss, or excess deflection. Other exemplary configurations incorporate a piezoelectric element onto a panel of glass or at a sealed interface of a door, window, secure cabinet or other access structure. In these configurations, piezoelectric triggering mechanism 10 operates as a security device, detecting when a window breaks or an access structure is opened.

Although the discussion herein is directed mainly to the use of a piezoelectric triggering mechanism employed in a tire environment, it should be appreciated that the present subject matter should not be unnecessarily limited to such applications.

Piezoelectric element 12 may correspond to any one of a variety of different forms, including single crystal or polycrystalline structures, piezoceramic or other piezoelectric wafer structures or piezoelectric fibers. Furthermore, piezoelectric element 12 may comprise one or more of a variety of piezoelectric materials, including but not limited to barium titanate, lead zirconate titanate (PZT), quartz, cadmium sulfide, polyvinylidene fluoride (PVDF) or polyvinyl chloride (PVC), or other piezoelectric materials as may be recognized by one of ordinary skill in the art. In some particular embodiments, piezoelectric element 12 corresponds to a piezoelectric substrate surface (such as one made from single crystal quartz ($SiO_2$)) that forms the transducer element for a surface acoustic wave (SAW) sensor. A particular example of such a SAW sensor is one developed by TRANSENSE TECHNOLOGIES, PLC of the United Kingdom. Specific aspects of such a device are disclosed in published U.S. Patent Application Nos. 2002/0117005 (Viles et al.) and 2004/0020299 (Freakes et al.), both of which are incorporated herein by reference for all purposes.

Referring still to FIG. 1, a conditioning circuit 14 may be coupled to piezoelectric element 12 to modify or condition the relatively large impulse of electrical energy that is generated by piezoelectric element 12 when such element is cracked or broken. In some embodiments, conditioning circuit 14 may include an energy storage element (e.g., a capacitor) configured to store energy generated by piezoelectric element 12 for some predetermined amount of time such that the energy storage device can be subsequently read to determine if piezoelectric element 12 had cracked or broken. In some embodiments, conditioning circuit 12 provides a comparator feature for comparing the energy output of piezoelectric element 12 with some predetermined threshold to determine when the energy level output by piezoelectric element 12 exceeds normal levels characteristic of mere deformation of piezoelectric element 12. An appropriate threshold level for such a comparison may be readily determined by one of ordinary skill in the art and may vary depending on the size and type of material used for piezoelectric element 12 as well as other circuit design parameters.

Referring still further to FIG. 1, piezoelectric triggering mechanism 10 may also include a modulation circuit 16 coupled to conditioning circuit 14 that is configured to receive a conditioned energy signal from conditioning circuit 14 and radiate a triggering signal therefrom. In some embodiments, modulation circuit 16 may correspond to a resonant circuit or an antenna. In one embodiment, such as when piezoelectric element 12 corresponds to a SAW transducer, modulation circuit 16 may correspond to the electrodes of the SAW device.

Once a meaningful signal indicative of device breakage is generated and radiated by piezoelectric triggering mechanism 10, a receiver 18 provided in a remote yet proximal location relative to piezoelectric triggering mechanism 10 may be configured to receive a signal indication from the triggering mechanism. This transmitted signal will be referred to herein as either a triggering signal or a breakage indication signal. In embodiments of the present technology where triggering mechanism 10 is incorporated in a tire environment, receiver 18 may be configured to relay indication of piezoelectric breakage from the triggering mechanism to an onboard vehicle monitoring system to alert a driver of the corresponding tire condition. Indication may also be relayed to a other monitoring locations, such as available through in-vehicle safety and security systems such as OnStar™ brand systems and others.

A delay line 17 may also be included in piezoelectric triggering mechanism 10 of FIG. 1. Delay line 17 may be programmed to modify the signal that will be radiated from triggering mechanism 10. For example, delay line 17 could be employed to form a series of energy pulses, perhaps as simple as a pair or triplet of pulses, referred to herein as an identification pattern. The delay line could be configured to send the breakage indication signal multiple times in a row (e.g., once every 50 microseconds), although it should be appreciated that receiver 18 will have a better chance of detecting one of the earliest transmitted series of pulses. Utilization of such a predetermined output series could help distinguish a signal indicative of the cracking or breaking of piezoelectric element 12 from other noise that may be picked up at receiver 18. If piezoelectric element 12 corresponds to the transducer of a SAW device, such SAW may in some embodiments correspond to a SAW-based RFID device, which can be programmed to provide the same effect as delay line 17. Receiver 18 is also preferably configured to monitor a given bandwidth (for example, a 10 kHz bandwidth around the resonant frequency of piezoelectric element 10) so as to further limit potential errors in detection of the triggering event(s).

In further accordance with FIG. 1, it will be appreciated that portions of piezoelectric triggering mechanism 10 may be mounted to or integrated with a substrate surface 19, before integration in its application environment (e.g., tire or sealed access structure). Substrate surface 19 may also have an adhesive backing to facilitate mounting of the triggering mechanism to its application environment.

Figure 2:
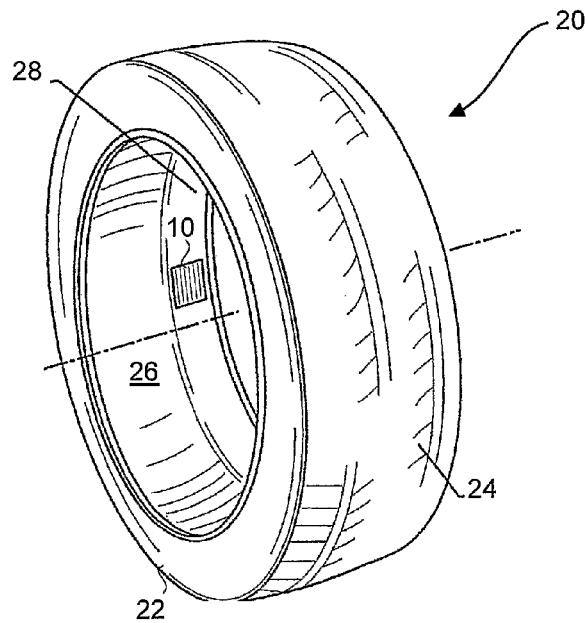
FIG. 2 provides an isometric view of an exemplary tire assembly in accordance with the present subject matter, illustrating a potential configuration for integrating a piezoelectric triggering mechanism with a pneumatic tire structure.

Referring now to FIG. 2, a tire assembly 20 in accordance with the present subject matter includes a piezoelectric triggering mechanism 10 integrated within a selected location of pneumatic tire structure 22. Pneumatic tire structure 22 generally includes a crown having a tread portion 24 for making contact with a ground surface, an interior crown surface 26 and interior sidewall surface 28. In one exemplary embodiment, triggering mechanism 10 may be mounted to interior sidewall surface 28 of tire structure 22. Such location is generally well-suited to crack or break the piezoelectric element within triggering mechanism 10 when tire structure 22 loses pressure while mounted to a wheel rim. In some embodiments, the piezoelectric element may also be designed to break or crack upon a variety of conditions causing excess deflation in the tire, such as underinflation, overloading, severe impact, etc. In accordance with the variety of possible locations for a piezoelectric triggering mechanism, it should be understood that the term "integrated" generally encompasses all possible locations, including being mounted on or in a tire structure.

Figure 3:
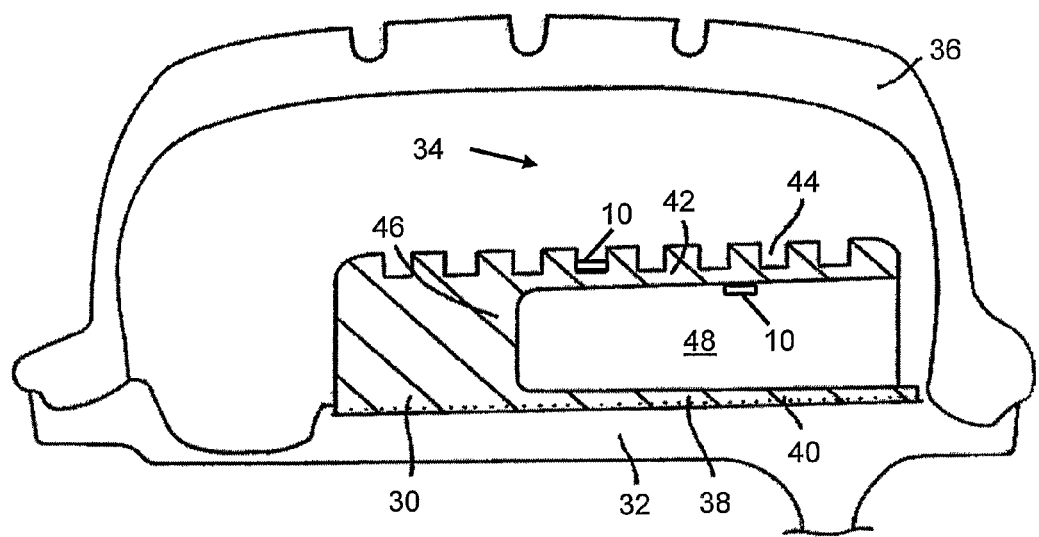
FIG. 3 provides an axial half-sectional view of a tire having a safety support mounted on a wheel rim inside the tire and with an integrated piezoelectric triggering mechanism illustrated in alternative locations in accordance with aspects of the present invention.
Figure 4:
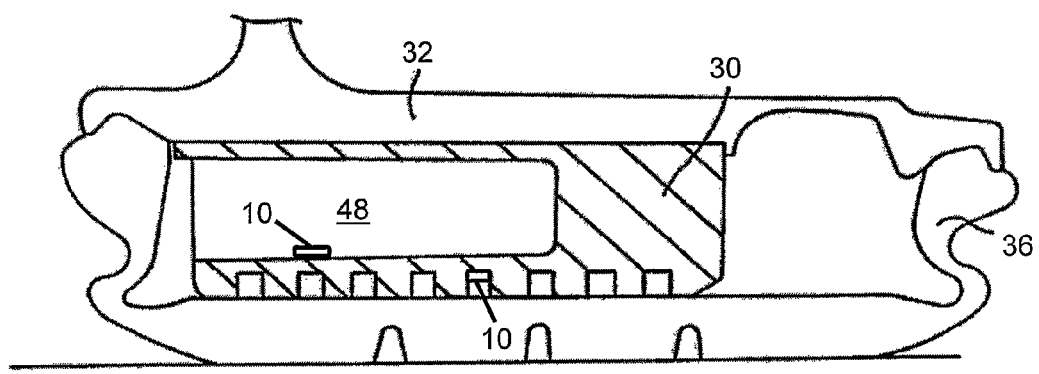
FIG. 4 provides an axial half-sectional view of the tire and safety support of FIG. 3 in which the safety support is in a run-flat condition.

The disclosed piezoelectric triggering mechanisms may also be utilized in non-conventional tires, in other words, tires having variations to a typical pneumatic tire structure such as represented in FIG. 2. In one example, a piezoelectric triggering mechanism 10 may be incorporated into tires having safety support features mounted inside their tires on their wheel rims in order to take up the load in the event of tire failure, thus supporting the tread strip of a tire in the event of a loss of inflation pressure. FIGS. 3 and 4 are now discussed to illustrate aspects of such a tire with safety support features. FIG. 3 provides an axial half-sectional view of a safety support 30 mounted around a wheel rim 32 and inside the cavity 34 of a corresponding tire 36. The tire 36 is designed to be mounted on the wheel rim 32 and in particular has two beads of different diameters. The support 30 has three main parts: a base 38 of annular overall shape and reinforced with a ply 40 oriented longitudinally at substantially zero degrees, a substantially annular cap 42 with longitudinal grooves 44 in its radially outer wall, and an annular body 46 for joining the base 38 and the cap 42 together. The cavity defined by portion 48 makes it possible to reduce the weight of support 30 to give uniform support under run-flat conditions (i.e., under full or partial loss of tire pressure).

FIG. 4 shows a safety support similar to that of FIG. 3 while it is in operation along a ground surface, e.g., during a run-flat condition. The cap 42 of the support 30 is in contact with the radially inner surface of the cap of the tire 36, thus preventing the tire 36 from riding on the wheel rim 32 during loss of air pressure in tire cavity 34. Additional details of a tire with the safety support feature described above are disclosed in U.S. Pat. No. 5,891,279 (Lacour), which is incorporated by reference herein for all purposes. It should be appreciated that other specific safety supports may be integrated within a tire structure. Although the support described in Lacour is a generally solid circular device, other support embodiments may be made of other support materials (e.g., foam rubber, that undergoes deformation when the tire is in a run-flat mode).

Referring still to FIGS. 3 and 4, the piezoelectric element of piezoelectric triggering mechanism 10 may be integrated with the safety support 30 of such exemplary run-flat tire structures such that breakage of the piezoelectric element may serve as an indication that the tire was run in a deflated mode at some time. Flexure of safety support 30 during such an occurrence would likely transfer deformation to the quartz, resulting in its breakage. For example, one or more circuit elements of triggering mechanism 10 may be mounted on or integrated with one of the longitudinal grooves 44 or cavity defined by portion 48 of safety support 30, such as illustrated in FIGS. 3 and 4. It should be appreciated that the piezoelectric element 12 and optional other elements of triggering mechanism 10 may be integrated with other portions of tire structure 36 or safety support 30 that those illustrated. It should be further appreciated that although FIGS. 3 and 4 illustrate triggering mechanisms integrated at two distinct locations relative to safety support 30, in some embodiments, only one triggering mechanism 10 will be present in each tire.

Although examples are presented herein of a piezoelectric triggering mechanism employed in a tire environment, it should be appreciated that the present subject matter should not be unnecessarily limited to such applications. Additional vehicle applications include use of the disclosed piezoelectric triggering mechanisms to signal air bag deployment, seat belt actuation, etc. Still further potential applications may include self-powered smoke alarms that require no battery power, fire alarms that require no electricity, wireless/batteryless rupture sensors (e.g., to provide proof positive of breakage in a narcotics cabinet in a hospital or other medical facility), and security systems that work after power has been intentionally or accidentally cut off.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A piezoelectric triggering mechanism, comprising:
    a pneumatic tire structure characterized by a crown having a tread portion for making contact with a ground surface; and
    a piezoelectric element configured to crack or break upon being subjected to a sufficient amount of mechanical force, said piezoelectric element generating a burst of electromagnetic energy upon cracking or breaking; and
    a modulation circuit coupled to said piezoelectric element and configured to receive electromagnetic energy from said piezoelectric element and to radiate a triggering signal therefrom when the energy level output by the piezoelectric element exceeds normal levels characteristic of mere deformation of the piezoelectric element
    wherein said piezoelectric element is integrated at a select location relative to said pneumatic tire structure such that excess deflection of said pneumatic tire structure results in the cracking or breaking of said piezoelectric element.

2. A piezoelectric triggering mechanism as in claim 1, further comprising a conditioning circuit linking said piezoelectric element to said modulation circuit, said conditioning circuit configured to condition an energy signal corresponding to said burst of electromagnetic energy.

3. A piezoelectric triggering mechanism as in claim 1, wherein said piezoelectric element comprises a surface acoustic wave (SAW) transducer.

4. A piezoelectric triggering mechanism as in claim 3, wherein said modulation circuit comprises electrodes of said SAW transducer.

5. A piezoelectric triggering mechanism as in claim 2, wherein said conditioning circuit comprises an energy storage element configured to store energy generated by said piezoelectric element for subsequent identification that the piezoelectric element was cracked or broken.

6. A piezoelectric triggering mechanism as in claim 1, wherein said modulation circuit comprises one of a resonant circuit or an antenna.

7. A piezoelectric triggering mechanism as in claim 2, wherein said conditioning circuit comprises a comparator element for comparing the output of said piezoelectric element with a predetermined threshold level.

8. A piezoelectric triggering mechanism as in claim 1, further comprising a substrate on which said piezoelectric element is provided.

9. A piezoelectric triggering mechanism as in claim 8, wherein said substrate includes an adhesive backing.

10. A piezoelectric triggering mechanism as in claim 1, wherein the occurrence of excess deflection of said pneumatic tire structure is caused by one of under-inflation, loss of pressure and severe impact.

11. A piezoelectric triggering mechanism as in claim 8, further comprising a safety support configured for mounting on a wheel rim inside of said pneumatic tire structure in order to support the tread portion of said pneumatic tire structure in the event of loss of inflation.

12. A piezoelectric triggering mechanism as in claim 11, wherein said piezoelectric element is integrated at a select location relative to said safety support.

13. A piezoelectric triggering mechanism as in claim 11, wherein said safety support comprises an annular body having an inner surface intended to fit around the wheel rim and an outer cap intended to be engaged by the tread portion in the event of a loss of pressure.

14. A method of detecting a triggered event, comprising the steps of:
- providing a piezoelectric element configured to crack or break upon being subjected to a sufficient amount of mechanical force, said piezoelectric element configured to generate a burst of electromagnetic breaking;
- providing a modulation element coupled to said piezoelectric element and configured to receive the burst of electromagnetic energy and to radiate a breakage indication signal therefrom when the energy level output by the piezoelectric element exceeds normal levels characteristic of mere deformation of the piezoelectric element;
- providing a remote receiver for detecting transmission of the breakage indication signal when the piezoelectric element cracks or breaks; and
- locating the piezoelectric element at a select location relative to a pneumatic tire structure such that excess deflection of the pneumatic tire structure results in the cracking or breaking of said piezoelectric element.

15. A method as in claim 14, further comprising a step of relaying an alert when the remote receiver receives the breakage indication signal from the piezoelectric and modulation elements.

16. A method as in claim 14, further comprising the steps of:
- providing the piezoelectric and modulation elements on a substrate; and
- adhering the substrate to a given surface.

17. A method as in claim 14, further comprising a step of manipulating the triggering signal such that the signal radiated from the modulation element includes an identification pattern.

18. A piezoelectric triggering mechanism as in claim 1, wherein said piezoelectric element is provided at an interior side wall surface of said pneumatic tire structure.

* * * * *